United States Patent [19]
Hirai et al.

[11] Patent Number: 6,105,082
[45] Date of Patent: Aug. 15, 2000

[54] DATA PROCESSOR USED IN A DATA TRANSFER SYSTEM WHICH INCLUDES A DETECTION CIRCUIT FOR DETECTING WHETHER PROCESSOR USES BUS IN A FORTHCOMING CYCLE

[75] Inventors: Takayasu Hirai, Osaka; Kazuhiko Hara, Hyogo, both of Japan

[73] Assignee: Ricoh Company, Ltd., Tokyo, Japan

[21] Appl. No.: 09/076,755

[22] Filed: May 12, 1998

[30] Foreign Application Priority Data

May 15, 1997 [JP] Japan .................................. 9-125390

[51] Int. Cl.⁷ .................................................. G06F 13/16
[52] U.S. Cl. ............................... 710/28; 710/28; 710/23; 710/18; 711/154
[58] Field of Search .................................... 710/28, 23, 40, 710/107, 110, 7, 18, 22, 24, 61, 240; 711/137, 152, 147, 154; 712/225

[56] References Cited

U.S. PATENT DOCUMENTS

| | | | |
|---|---|---|---|
| 4,494,193 | 1/1985 | Brahm et al. | 364/200 |
| 4,760,521 | 7/1988 | Rewald et al. | 364/200 |
| 5,067,075 | 11/1991 | Sugano et al. | 395/425 |
| 5,111,424 | 5/1992 | Donaldson et al. | 395/725 |
| 5,455,918 | 10/1995 | Fowler et al. | 395/375 |
| 5,574,868 | 11/1996 | Marisetty | 395/298 |
| 5,633,865 | 5/1997 | Short | 370/412 |

FOREIGN PATENT DOCUMENTS

| | | | |
|---|---|---|---|
| 449457 | 2/1992 | Japan | G06F 13/28 |
| 4116751 | 4/1992 | Japan | G06F 13/28 |
| 5204826 | 8/1993 | Japan | G06F 13/28 |
| 8106432 | 4/1996 | Japan | G06F 13/28 |

Primary Examiner—Thomas C. Lee
Assistant Examiner—Twanna Gossom
Attorney, Agent, or Firm—Cooper & Dunham LLP

[57] ABSTRACT

A processor used in a synchronous data transfer system in which a processor, a direct memory access controller and peripheral devices are connected to a memory via the same bus, includes a detection circuit for detecting whether the processor uses the bus in a forthcoming cycle, and a control circuit having a first terminal for acknowledging a request signal from the direct memory access controller requesting a use of the bus, only when the detection circuit detects that the processor does not use the bus in the forthcoming cycle, wherein the control circuit discards a right to use the bus and outputs a response signal to the direct memory access controller indicating that the processor grants the right to use the bus to the direct memory access controller, when the request signal is acknowledged.

18 Claims, 5 Drawing Sheets

DATA PROCESSOR USED IN A DATA TRANSFER SYSTEM WHICH INCLUDES A DETECTION CIRCUIT FOR DETECTING WHETHER PROCESSOR USES BUS IN A FORTHCOMING CYCLE

BACKGROUND OF THE INVENTION

1. Field of the Invention

The present invention generally relates to a processor and a synchronous data transfer system using the processor, for high-speed data transfer between a memory and a peripheral device in accordance with the direct memory access (hereinafter, referred to as DMA) system.

2. Description of the Related Art

In a synchronous system in which a processor and peripheral devices are connected to a memory via the same bus, data may be read by a peripheral device from the memory without being directed by the processor (CPU) such that the data is directly transferred between the peripheral device and the memory. Such a data transfer system is referred to as a DMA data transfer.

Figure 1:
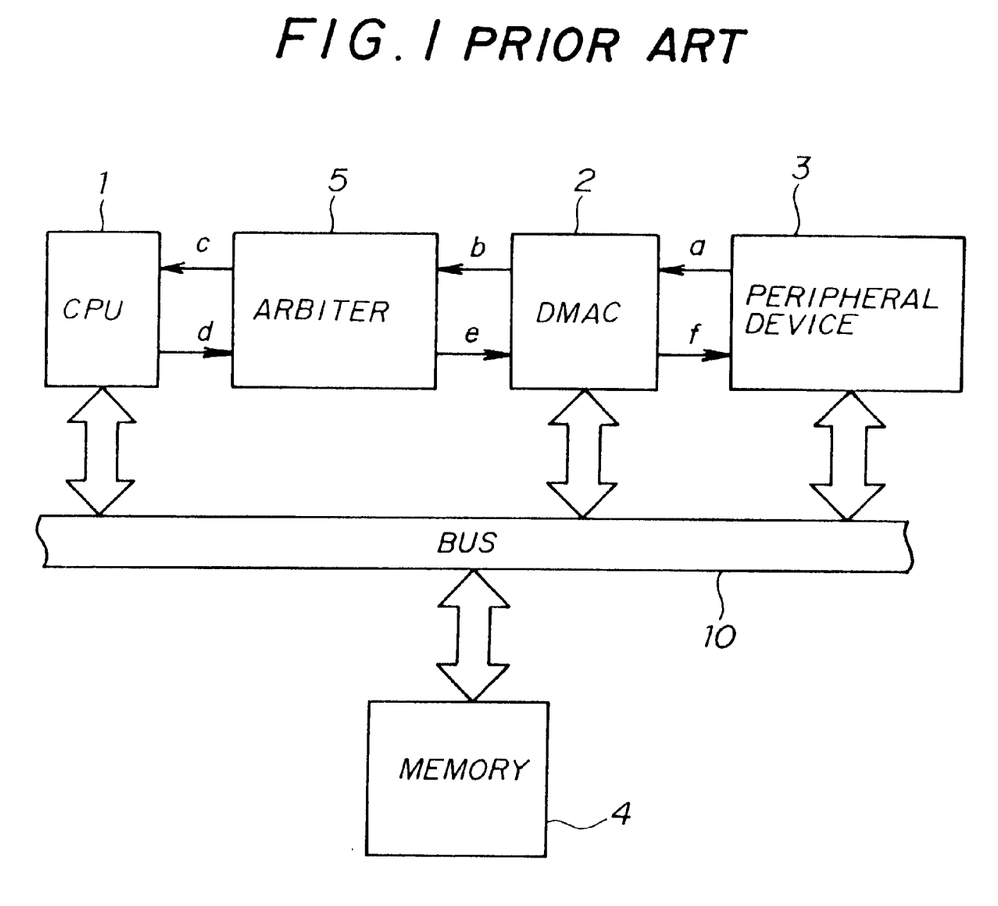
FIG. 1 shows a synchronous system according to the related art.

FIG. 1 shows a synchronous system according to the related art. A CPU 1, a DMA controller (hereinafter, referred to as DMAC) 2, a peripheral device 3 and a memory 4 are connected to a data/address bus 10. When the DMA transfer is performed, the peripheral device 3 outputs a DMA request signal a to the DMAC 2. When the DMA request signal a is input to the DMAC 2, the DMAC 2 outputs a data bus use request signal b to an arbiter 5 in order to acquire a right to use the bus 10 from the CPU 1. When the data bus use request signal b is input to the arbiter 5, the arbiter 5 outputs a signal c for suspending the use of the bus 10 to the CPU 1. When the signal c is input to the CPU 1, the CPU 1 grants the right to use the bus 10 to the arbiter 5 and notifies the arbiter 5 accordingly by outputting a predetermined response signal d (referred to as a bus acknowledge signal in some cases) to the arbiter 5. The arbiter 5 receiving the predetermined response signal d outputs a signal e for enabling the use of the bus 10 to the DMAC 2. The DMAC 2 receiving the signal e outputs a DMA transfer enable signal f to the peripheral device 3 so as to execute DMA transfer between the peripheral device 3 and the memory 4.

As described above, in the system according to the related art, the right to use the bus 10 is granted to the peripheral device 3 immediately upon the input of the DMA request signal a from the peripheral device 3 so that the DMA transfer between the peripheral device 3 and the memory 4 is immediately enabled, irrespective of whether the CPU 1 is using the bus 10.

In the following description, it is assumed that instructions supplied to the CPU 1 demand that a cycle in which the CPU 1 uses the data/address bus 10 (hereinafter, referred to as a CPU cycle) and an idle or sleep cycle (hereinafter, referred to as an idle cycle) alternate.

Figure 2:
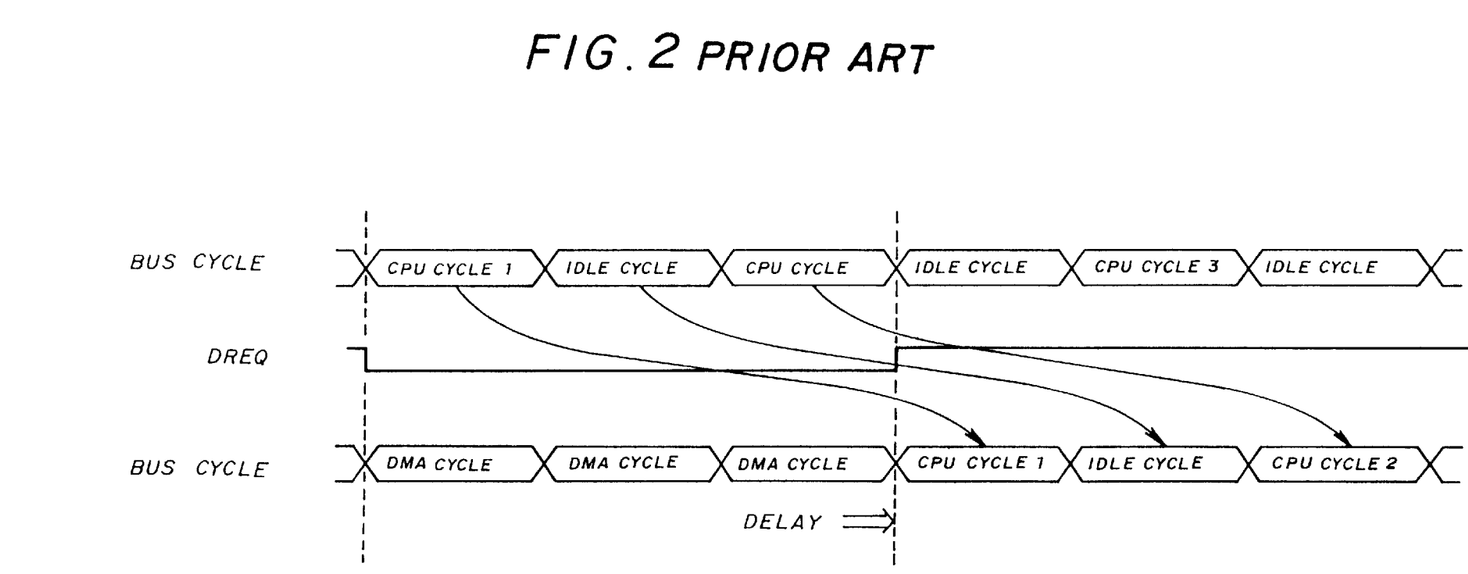
FIG. 2 is a time chart showing a bus cycle occurring when a DMA request signal is output by a peripheral device.

FIG. 2 is a time chart showing a bus cycle occurring when the DMA request signal a is output by the peripheral device 3. As described already, the system according to the related art is constructed such that the DMAC 2 grants the right to use the bus 10 to the peripheral device 3 immediately upon the input of the DMA request signal a from the peripheral device 3 to the DMAC 2. When a series of DMA request signals arrive from the peripheral device 3 in three consecutive cycles, the right to use the bus 10 is immediately granted to the peripheral device 3. After performing the DMA transfer for three cycles, the CPU 1 is granted the right to use the bus 10 so that the CPU cycle 1, the idle cycle and the CPU cycle 2 are performed in the stated order.

When the peripheral device 3 issues a DMA request while the CPU 1 is using the bus 10, the process by the CPU 1 is suspended, reducing the processing performance of the CPU 1.

Various types of DMAC are proposed in order to resolve the aforementioned problem. Japanese Laid-Open Patent Application No. 4-49457 discloses a DMAC whereby a data transfer execution cycle subsequent to acquisition of the right to use the bus is controlled in accordance with the status of use of the bus. More specifically, when valid DMA request signals are received from peripheral devices, an order of priority is assigned to each of the request signals. The DMA transfer is started in a channel assigned the highest order of priority. Only one of a predetermined number of bus cycles is used for DMA transfer. When an access from the CPU occurs while the bus is used in the DMA transfer, an interval of one bus cycle is introduced before a signal for permitting the DMA transfer is output to the DMAC. With this arrangement, the CPU processing while the DMA transfer is being executed is improved. However, the DMAC according to Japanese Laid-Open Patent Application No. 4-49457 grants the right to access the bus to a peripheral device immediately when a high-priority request for using the bus is issued by the peripheral device, even when the CPU is using the bus. Accordingly, the process by the CPU may have to be suspended, thus causing the processing performance of the CPU to suffer.

Japanese Laid-Open Patent Application No. 4-116751 discloses a data transfer system in which the time in which the bus is occupied by DMA transfer is reduced so that the time in which the CPU is caused to sleep is reduced. However, the system according to Japanese Laid-Open Patent Application No. 4-116751 also grants the right to use the bus to a peripheral device immediately when the peripheral device requests the use of the bus, irrespective of how the bus is accessed by the CPU. Accordingly, the process by the CPU may have to be suspended, thus causing the processing performance of the CPU to suffer.

Japanese Laid-Open Patent Application 8-106432 discloses a DMA control circuit in which two data buses, one for the access by the CPU and the other for DMA transfer, are provided so that the CPU process need not be suspended even when the DMA transfer is proceeding. While such a DMA control circuit prevents the CPU processing performance from suffering due to the DMA transfer, the cost of the resultant data transfer system is high due to the provision of the two buses.

Japanese Laid-Open Patent Application 5-204826 discloses a data processing device in which a DMA request signal directly input from the DMAC to the CPU is handled in an identical manner as a bus access request signal generated inside the CPU such that both the DMA request signal and the bus access request signal are handled as a prerequisite to generate a bus cycle. According to such an arrangement, a non-used period elapsed between an output of a hold response signal from the CPU in response to a DMA request and the DMA transfer is eliminated, and a non-used period elapsed between the completion of the DMA transfer and the subsequent use of the data bus by the CPU is eliminated. According to this data processing device, the non-used period in which the data bus is not used is reduced. However, the right to use the bus is granted to a peripheral device immediately upon a request therefrom for using the bus, irrespective of how the CPU accesses the bus.

Accordingly, the process by the CPU may have to be suspended, thus causing the processing performance of the CPU to suffer.

SUMMARY OF THE INVENTION

Accordingly, a general object of the present invention is to provide a data transfer system in which the aforementioned problems are eliminated.

Another and more specific object is to provide a data transfer system in which reduction in the processing performance of the CPU is moderated and the data bus is used efficiently.

The aforementioned objects can be achieved by a processor used in a synchronous data transfer system in which a processor, a direct memory access controller and peripheral devices are connected to a memory via the same bus, comprising: a detection circuit for detecting whether the processor uses the bus in a forthcoming cycle; and a control circuit having a first terminal that receives a request signal from the direct memory access controller requesting a use of the bus, only when the detection circuit detects that the processor does not use the bus in the forthcoming cycle, wherein the control circuit discards a right to use the bus and outputs a response signal (referred to as a bus acknowledge signal in some cases) to the direct memory access controller indicating that the processor grants the right to use the bus to the direct memory access controller, when the request signal is received.

According to this processor, it is possible to execute a DMA transfer without interrupting a processor process, by releasing cycles not used by the processor. Preferably, the processor may also be provided with an additional terminal for acknowledging a request for DMA transfer immediately upon receipt thereof so that a right to use the bus is immediately discarded and the DMA transfer is immediately started. With this, DMA transfer can be executed flexibly depending on how the processor is using the bus.

The aforementioned objects can also be achieved by a processor used in a synchronous data transfer system in which a processor, a direct memory access controller and peripheral devices are connected to a memory via the same bus, comprising: a detection circuit for detecting whether the processor uses the bus in a forthcoming cycle and having a first terminal for outputting a predetermined detection signal when it is determined that the processor does not use the bus in the forthcoming cycle; and a control circuit having a second terminal for acknowledging a request signal requesting a grant of a right to use the bus, wherein the control circuit discards the right to use the bus and outputs a predetermined response signal indicating that the processor grants the right to use the bus, via a third terminal, when the request signal is acknowledged.

According to this processor, a predetermined detection signal is output from the first terminal only when the processor does not use the bus in the forthcoming cycle. By timing the signal input to the second terminal appropriately based on the detection signal, it is possible to execute a DMA transfer without interrupting a processor process.

The aforementioned objects can also be achieved by a synchronous data transfer system in which a processor, a direct memory access controller and peripheral devices are connected to a memory via the same bus, wherein the direct memory access controller outputs a request signal to the processor requesting a use of the bus, in response to a request from the peripheral device requesting execution of data transfer in accordance with a direct memory access system, and the processor comprises: a detection circuit for detecting whether the processor uses the bus in a forthcoming cycle; and a control circuit having a first terminal for acknowledging the request signal from the direct memory access controller requesting the use of the bus, only when the detection circuit detects that the processor does not use the bus in the forthcoming cycle, wherein the control circuit discards a right to use the bus and outputs a predetermined response signal to the direct memory access controller indicating that the processor grants the right to use the bus to the direct memory access controller, when the request signal from the direct memory access controller requesting the use of the bus is acknowledged, and the direct memory access controller executes data transfer in accordance with the direct memory access system between the requesting peripheral device and the memory, in a bus cycle in which the predetermined response signal is received from the processor.

The aforementioned objects can also be achieved by a data transfer system in which a processor, a signal control circuit, a direct memory access controller and peripheral devices are connected to a memory via the same bus, wherein the direct memory access controller outputs a request signal to the signal control circuit requesting a use of the bus, in response to a request from the peripheral device requesting execution of data transfer in accordance with a direct memory access system, and the processor comprises: a detection circuit for detecting whether the processor uses the bus in a forthcoming cycle and having a first terminal for outputting a predetermined detection signal when it is determined that the processor does not use the bus in the forthcoming cycle; and a control circuit having a second terminal for acknowledging a grant request signal requesting a grant of a right to use the bus, wherein the control circuit discards a right to use the bus and outputs, via a third terminal, a predetermined response signal to the direct memory access controller indicating that the processor grants the right to use the bus to the direct memory access controller, when the grant request signal is acknowledged, the signal control circuit is provided with a fourth terminal for acknowledging the request signal from the direct memory access controller requesting the use of the bus only when it is determined that the processor does not use the bus in the forthcoming cycle, by referring to a detection result output from the first terminal in the processor, the signal control circuit outputting the grant request signal to the second terminal of the processor when the request signal requesting the use of the bus from the direct memory access controller is acknowledged, and the direct memory access controller executes data transfer in accordance with the direct memory access system between the requesting peripheral device and the memory, in a bus cycle in which the predetermined response signal is received from the processor.

According to the data transfer systems of the invention, the processor acknowledges a signal from the DMAC requesting the use of the bus, only when the processor does not use the forthcoming cycle. Accordingly, it is possible to execute a DMA transfer without interrupting the processor process. Thus, the processor process is prevented from suffering due to the execution of the DMA transfer. In a preferred data transfer system, the processor is also provided with an additional terminal for acknowledging a request for DMA transfer immediately upon receipt thereof so that a right to use the bus is immediately discarded and the DMA transfer is immediately started. With this, DMA transfer can be executed flexibly depending on how the processor is using the bus.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

A description will now be given, with reference to the drawings, of the data transfer system according to the embodiments of the present invention.

Figure 3:
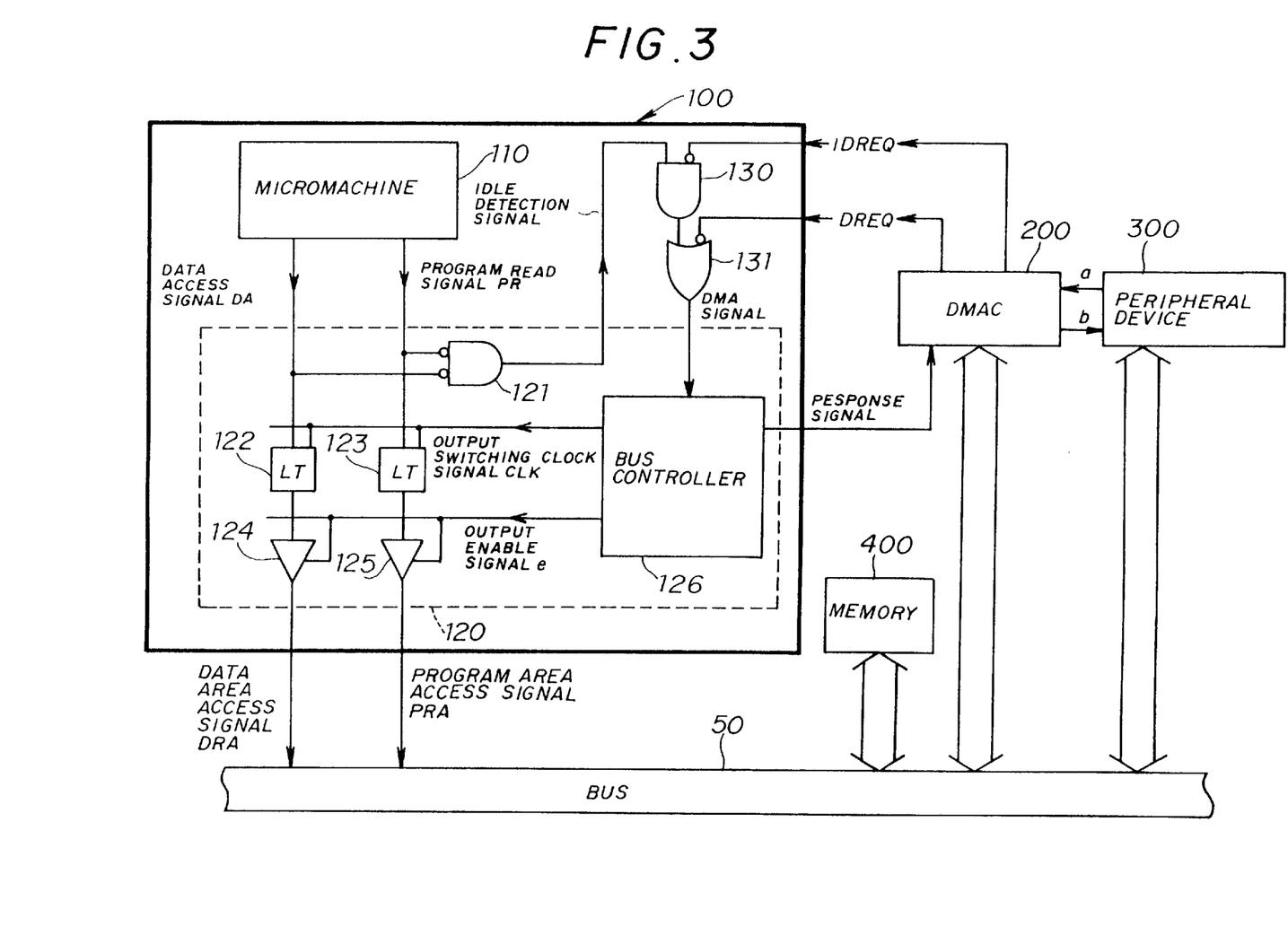
FIG. 3 is a block diagram showing a construction of the data transfer system according to a first embodiment of the present invention.

FIG. 3 is a block diagram showing a construction of the data transfer system according to a first embodiment of the present invention. A processor (CPU) 100, a DMAC 200, a peripheral device 300 and a memory 400 are connected to a bus 50. When a DMA request signal a is output by the peripheral device 300 requesting execution of DMA transfer, the DMAC 200 outputs an IDREQ signal set at "0" to the CPU 100. Only when the forthcoming cycle is an idle cycle, the CPU 100 returns a response signal D set at "1" to the DMAC 200 indicating that the CPU 100 grants a right to use the bus 50 to the DMAC 200. The DMAC 200 receiving the response signal D set at "1" outputs a DMA transfer permit signal b to the peripheral device 300 and executes the DMA transfer between the peripheral device 300 and the memory 400. By using a cycle not used by the CPU 100 for DMA transfer, the process by the CPU 100 is prevented from being suspended.

The DMAC 200 outputs an IDREQ signal while a unit period of time for one bus cycle lasts. When the response signal D indicating that the use of the bus is prohibited is returned from the CPU 100 in response to three consecutive inputs of the IDREQ signal set at "0", the DMAC 200 outputs a DREQ signal set at "0". When the DREQ signal is input, the CPU 100 grants a right to use the bus 50 to the DMAC 200, irrespective of how the forthcoming bus cycle is used, by returning the response signal D set at "1" indicating that the bus 50 can be used. For example, the DMAC 200 may be provided with a simple switching configuration so as to selectively output the IDREQ signal or the DREQ signal depending on the status and the type of the DMA request signal a from the peripheral device 300. The DMAC 200 may also be provided with a timer so that the DREQ signal is output when the response signal D set at "1" indicating that the bus can be used is not available from the CPU 100 until the count of the timer expires. With such a configuration, execution of the DMA transfer is prevented from being delayed due to a long occupancy of the bus 50 by the CPU 100.

A description will now be given of the configuration of the CPU 100. The CPU 100 comprises a micromachine 110, a bus interface unit (BIU) 120, an AND gate 130 and an OR gate 131. The BIU 120 includes a bus control unit 126 for controlling data output to the bus 50, a two-input NOR gate 121, latch circuits 122 and 123, tri-state buffers 124 and 125. A data access signal DA and a program read signal PR output from the micromachine 110 are latched by the latch circuits 122 and 123, respectively. The latch circuits 122 and 123 provide an output to the tri-state buffers 124 and 125, respectively, in synchronization with an output switching clock CLK that defines one bus cycle. The bus control unit 126 outputs an output enable signal e set at "1" to the tri-state buffers 124 and 125, when a DMA request is not issued by the peripheral device 300. In response to the signal e, the tri-state buffers 124 and 125 output a data area access signal DRA and a program area access signal to the bus 50, respectively.

If the forthcoming bus cycle is an idle cycle, the micromachine 110 does not read a program and data access is not performed. Such a feature of the CPU 100 is used to detect an idle cycle. More specifically, the two-input NOR gate 121 is used as a device for detecting an idle cycle. The data access signal DA and the program read signal PR are input to the two-input NOR gate 121. The NOR gate 121 outputs an IDLE detection signal set at "1" when the forthcoming cycle is an idle cycle. In case the data access signal DA is processed in the form of a read signal DAr and a write signal DAw, a three-input NOR gate may be used in place of the two-input NOR gate 121.

The IDLE detection signal output by the NOR gate 121 is fed to one input of the AND gate 130. The other input of the AND gate 130 is supplied with a signal obtained by inverting the IDREQ signal output by the DMAC 200. As described already, the IDREQ signal is set to "0" when a DMA request signal is issued from the peripheral device 300.

An output from the AND gate 130 is fed to an input of the OR gate 131. The other input of the OR gate 131 is supplied with a signal obtained by inverting the DREQ signal output by the DMAC 200. As described already, when the response signal D indicating that the use of the bus is prohibited is returned from the CPU 100 in response to three consecutive inputs of the IDREQ signal set at "0", the DMAC 200 outputs a DREQ signal set at "0".

A DMA signal, set to "1" when the forthcoming cycle is allocated to DMA transfer, is output from an output terminal of the OR gate 131. The DMA signal is fed to the bus control unit 126. Upon receipt of the input of the DMA signal at "1", the bus control unit 126 sets the output enable signal e to "0" (disable) and outputs the response signal D set at "1" to the DMAC 200 so as to enable the DMAC 200 to use the bus 50. When the DMA signal input to the bus control unit 126 is set at "0", the bus control unit 126 sets the output enable signal e to "1" (enable) and outputs the response signal D set at "0" to the DMAC 200 so as to disable the DMAC 200 from using the bus 50.

Referring to FIG. 3, if the DMAC 200 is configured to output the IDREQ signal and the DREQ signal set at "1" in response to the DMA request signal a from the peripheral device 300, the inverters provided at the input of the AND gate 130 and the input of the OR gate 131 are to be removed.

It is assumed that an instruction demanding that a CPU cycle in which the CPU 100 uses the bus 50 and an idle cycle alternate is supplied to the CPU 100.

Figure 4:
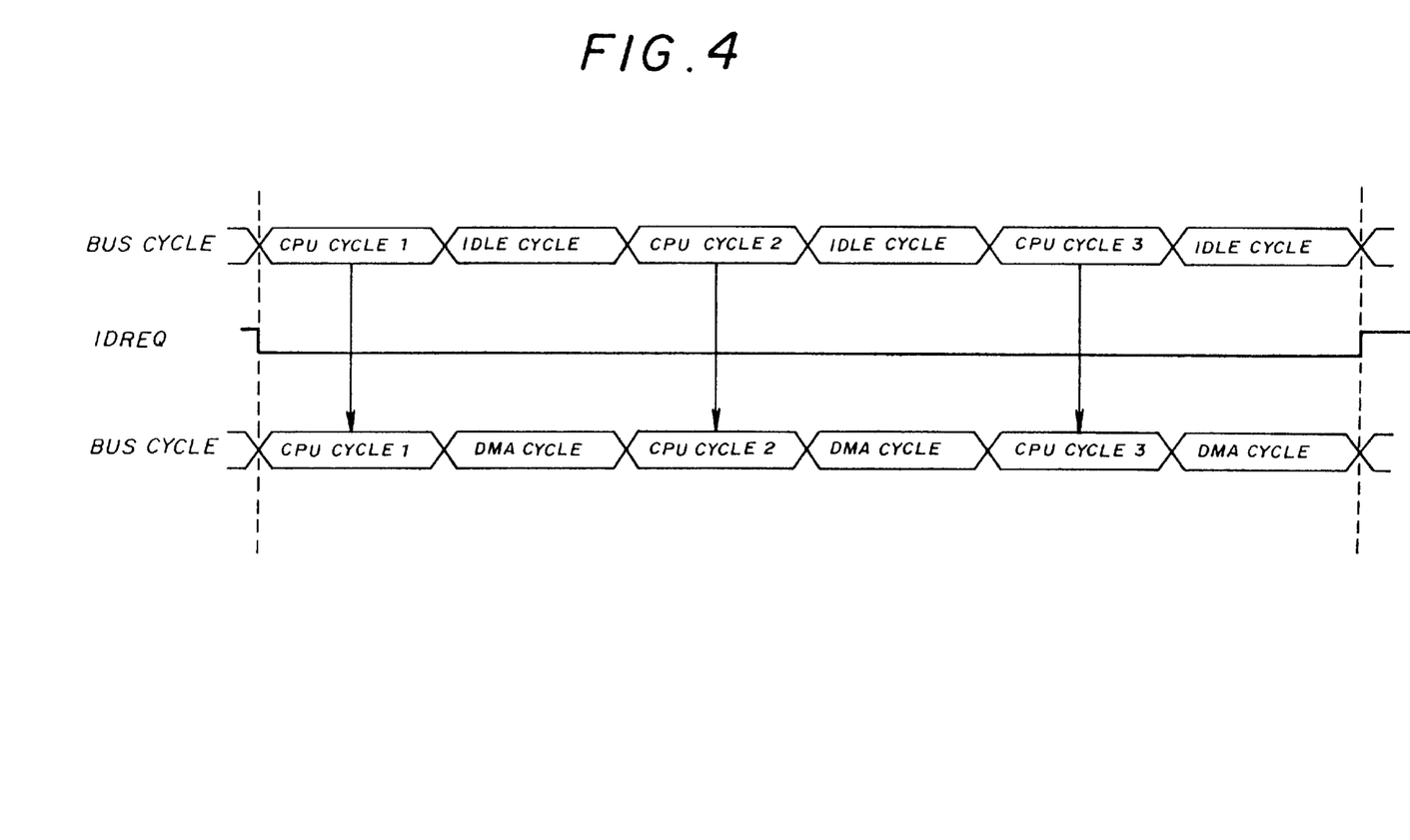
FIG. 4 is a time chart showing a bus cycle occurring when the DMA request signal is output by the peripheral device.

FIG. 4 is a time chart showing a bus cycle occurring when the DMA request signal a is output by the peripheral device 300. When the peripheral device 300 issues a DMA request to the DMAC 200 for three consecutive cycles in the form of the DMA request signal a, the DMAC 200 outputs the IDREQ signal set at "0" to the CPU 100. As described already, the CPU 100 examines how the bus 50 is used. When the forthcoming cycle is an idle cycle, the CPU 100 releases the bus 50 to the DMA transfer with respect to the peripheral device 300. That is, idle cycles that occur repeatedly between CPU cycles are released to DMA processes. In this case, the bus 50 is used such that the CPU cycle 1, the DMA cycle, the CPU cycle 2, the DMA cycle, the CPU cycle 3, the DMA cycle, . . . occur in the stated order.

By employing the data transfer system as described above, the DMA transfer is executed without suspending the process by the CPU 100. With this, the processing performance of the CPU 100 is prevented from suffering due to the DMA transfer. When the CPU 100 occupies the bus 50 for a long period of time, that is, when the response signal D set at "0" indicating that the use of the bus 50 is prohibited is returned for three consecutive cycles in response to the input of the IDREQ signal set at "0", the DREQ signal set at "0" is output so as to suspend the use of the bus 50 by the CPU 100 and execute the DMA transfer immediately. In this way, execution of the DMA transfer is prevented from being delayed due to a prolonged use of the bus 50 by the CPU 100.

Figure 5:
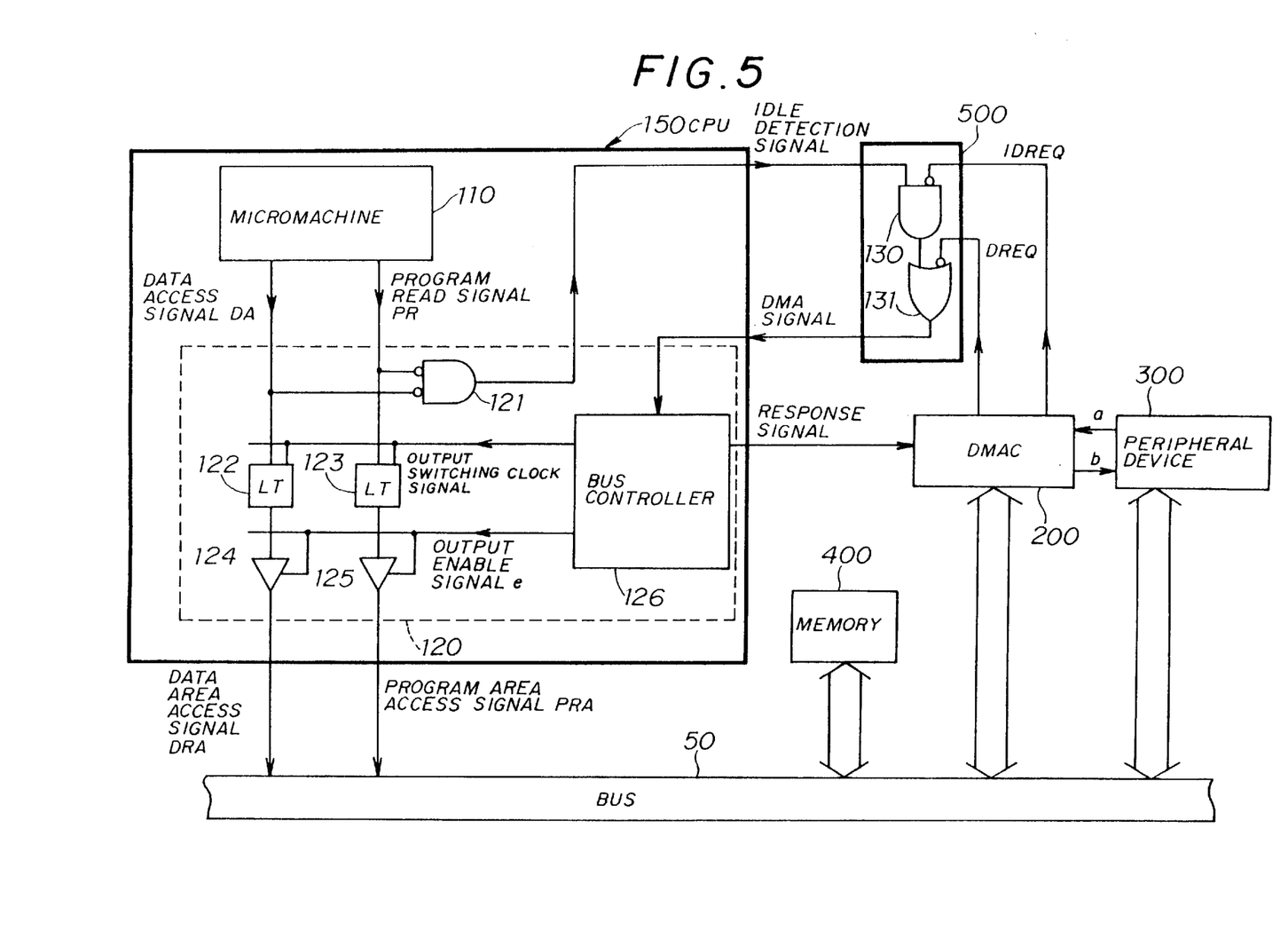
FIG. 5 shows a construction of the data transfer system according to a second embodiment of the present invention.

FIG. 5 shows a construction of the data transfer system according to a second embodiment of the present invention. Those components that are identical to the corresponding components of the data transfer system according to the first embodiment are designated by the same reference numerals, and the description thereof is omitted. In the system according to the second embodiment, a CPU 150 is used in place of the CPU 100, and a signal control circuit 500 is provided. The CPU 150 differs from the CPU 100 in that the AND gate 130 and the OR gate 131 are eliminated. The signal control circuit 500 is formed of the AND gate 130 and the OR gate 131 provided in the CPU 100. While the CPU 100 shown in FIG. 3 is provided with input terminals for receiving the IDREQ signal and the DREQ signal and an output terminal for outputting the response signal D output by the bus control unit 126, the CPU 150 is provided with an output terminal for outputting an IDLE detection signal set to "1" when the forthcoming cycle is an idle cycle, an input terminal for receiving the DMA signal output by the signal control circuit 500, and an output terminal for outputting the response signal D output by the bus control unit 126.

The IDLE detection signal input to the signal control circuit 500 is fed to one input of the AND gate 130. The other input of the AND gate 130 is supplied with a signal obtained by inverting the IDREQ signal from the DMAC 200. An output of the AND gate 130 is fed to one input of the OR gate 131. The other input of the OR gate 131 is supplied with a signal obtained by inverting the DREQ signal output by the DMAC 200. The OR gate 131 outputs the DMA signal set to "1" when the forthcoming cycle is allocated to the DMA transfer. The DMA signal is input to the bus control unit 126.

As has been described in the first embodiment, the bus control unit 126 receiving the DMA signal set at "1" sets the output enable signal e to "0" (disable) and outputs the response signal D set at "1" to the DMAC 200 so as to permit the DMAC 200 to use the bus 50. When the DMA signal input to the bus control unit 126 is set at "0", the bus control unit 126 sets the output enable signal e to "1" (enable) and outputs the response signal D set at "0" to the DMAC 200 so as to prohibit the DMAC 200 from using the bus 50.

Referring to FIG. 5, if the DMAC 200 is configured to output the IDREQ signal and the DREQ signal set at "1" in response to the DMA request signal a from the peripheral device 300, the inverters provided at the input of the AND gate 130 and the OR gate 131 are to be removed.

The present invention is not limited to the above-described embodiments, and variations and modifications may be made without departing from the scope of the present invention.

What is claimed is:

1. A processor used in a synchronous data transfer system in which a processor, a direct memory access controller and peripheral devices are connected to a memory via a common bus, comprising:

a detection circuit for detecting whether said processor uses the bus in a forthcoming cycle regardless of whether a read or write command is performed by said processor; and a control circuit for acknowledging a request signal from the direct memory access controller requesting a use of the bus, only when said detection circuit detects that said processor does not use the bus in the forthcoming cycle, by outputting a response signal to the direct memory access controller indicating that said processor grants the right to use the bus to the direct memory access controller, when the detection circuit detects that said processor does not use the bus in the forthcoming cycle.

2. The processor as claimed in claim 1, wherein said control circuit can acknowledge the request signal from the direct memory access controller requesting a use of the bus, irrespective of a result of detection by said detection circuit.

3. A processor used in a synchronous data transfer system in which a processor, a direct memory access controller and peripheral devices are connected to a memory via a common bus, comprising:

a detection circuit for detecting whether said processor uses the bus in a forthcoming cycle regardless of whether a read or write command is performed by said processor and for outputting a predetermined detection signal when it is determined that said processor does not use the bus in the forthcoming cycle; and a control circuit for acknowledging a request signal requesting a grant of a right to use the bus, by outputting a predetermined response signal indicating that said processor grants the right to use the bus, when the predetermined detection signal is output indicating that said processor does not use the bus in the forthcoming cycle.

4. A synchronous data transfer system in which a processor, a direct memory access controller and peripheral devices are connected to a memory via a common bus, wherein the direct memory access controller outputs a request signal to said processor requesting a use of the bus, in response to a request from the peripheral device requesting execution of a data transfer in accordance with a direct memory access, said processor comprising:

a detection circuit for detecting whether said processor uses the bus in a forthcoming cycle regardless of whether a read or write command is performed by said processor; and a control circuit for acknowledging the request signal from the direct memory access controller requesting the use of the bus, only when the detection circuit detects that said processor does not use the bus in the forthcoming cycle, by outputting a predetermined response signal to the direct memory access controller indicating that said processor grants the right to use the bus to the direct memory access controller, when the detection circuit detects that said processor does not use the bus in the forthcoming cycle, and wherein the direct memory access controller executes data transfer in accordance with the direct memory access between the requesting peripheral device and the memory, in a bus cycle in which the predetermined response signal is received from said processor.

5. The data transfer system as claimed in claim 4, wherein the control circuit provided in said processor can acknowledge the request signal from the direct memory access controller requesting the use of the bus, irrespective of a result of the detection by the detection circuit.

6. A data transfer system in which a processor, a direct memory access controller and peripheral devices are connected to a memory via a common bus, wherein the direct memory access controller outputs a request signal to a signal control circuit requesting a use of the bus, in response to a request from the peripheral device requesting execution of a data transfer in accordance with a direct memory access, said processor comprising:

a detection circuit for detecting whether said processor uses the bus in a forthcoming cycle regardless of whether a read or write command is performed by said processor and for outputting a predetermined detection signal when it is determined that said processor does not use the bus in the forthcoming cycle; and a control circuit for acknowledging a grant request signal from the signal control circuit requesting a grant of a right to use the bus by outputting a predetermined response signal to the direct memory access controller indicating that said processor grants the right to use the bus to the direct memory access controller, when the predetermined detection signal is output indicating that said processor does not use the bus in the forthcoming cycle, the signal control circuit acknowledging the request signal from the direct memory access controller requesting the use of the bus only when it is determined that said processor does not use the bus in the forthcoming cycle, by reference to the predetermined detection signal output from said processor, the signal control circuit outputting the grant request signal when the request signal requesting the use of the bus from the direct memory access controller is acknowledged, and the direct memory access controller executing a data transfer between the requesting peripheral device and the memory, in a bus cycle in which the predetermined response signal is received from said processor.

7. A processor method used in a synchronous data transfer system in which a processor, a direct memory access controller and peripheral devices are connected to a memory via a common bus, said method comprising:

a detection step for detecting whether said processor uses the bus in a forthcoming cycle regardless of whether a read or write command is performed by said processor; and a control step for acknowledging a request signal from the direct memory access controller requesting a use of the bus, only when said detection step detects that said processor does not use the bus in the forthcoming cycle, by outputting a response signal to the direct memory access controller indicating that said processor grants the right to use the bus to the direct memory access controller, when the detection circuit detects that said processor does not use the bus in the forthcoming cycle.

8. The method as claimed in claim 7, wherein said control step can acknowledge the request signal from the direct memory access controller requesting the use of the bus, irrespective of a result of detection by said detection step.

9. A processor method used in a synchronous data transfer system in which a processor, a direct memory access controller and peripheral devices are connected to a memory via a common bus, said method comprising:

a detection step for detecting whether said processor uses the bus in a forthcoming cycle regardless of whether a read or write command is performed by said processor and for outputting a predetermined detection signal when it is determined that said processor does not use the bus in the forthcoming cycle; and a control step for acknowledging a request signal requesting a grant of a right to use the bus by outputting a predetermined response signal indicating that said processor grants the right to use the bus, when the predetermined detection signal is output indicating that said processor does not use the bus in the forthcoming cycle.

10. A synchronous data transfer method in which a processor, a direct memory access controller and peripheral devices are connected to a memory via a common bus, wherein the direct memory access controller outputs a request signal to said processor requesting a use of the bus, in response to a request from the peripheral device requesting execution of a data transfer in accordance with a direct memory access, said method comprising:

a detection step for detecting whether said processor uses the bus in a forthcoming cycle regardless of whether a read or write command is performed by said processor; and a control step for acknowledging the request signal from the direct memory access controller requesting the use of the bus, only when the detection step detects that said processor does not use the bus in the forthcoming cycle by outputting a predetermined response signal to the direct memory access controller indicating that said processor grants the right to use the bus to the direct memory access controller, when the detection step detects that said processor does not use the bus in the forthcoming cycle, wherein the direct memory access controller executes data transfer in accordance with the direct memory access between the requesting peripheral device and the memory, in a bus cycle in which the predetermined response signal is received from said processor.

11. The data transfer method as claimed in claim 10, wherein the control step acknowledges the request signal from the direct memory access controller requesting the use of the bus, irrespective of a result of detection by the detection step.

12. A data transfer method in which a processor, a direct memory access controller and peripheral devices are connected to a memory via a common bus, wherein the direct memory access controller outputs a request signal to a signal control circuit requesting a use of the bus, in response to a request from the peripheral device requesting execution of a data transfer in accordance with a direct memory access, said method comprising:

a detection step for detecting whether said processor uses the bus in a forthcoming cycle regardless of whether a read or write command is performed by said processor and for outputting a predetermined detection signal when it is determined that said processor does not use the bus in the forthcoming cycle; and a control step for acknowledging a grant request signal from the signal control circuit requesting a grant of a right to use the bus by outputting a predetermined response signal to the direct memory access controller indicating that said processor grants the right to use the bus to the direct memory access controller, when the predetermined detection signal is output indicating that said processor does not use the bus in the forthcoming cycle, the signal control circuit acknowledging the request signal from the direct memory access controller requesting the use of the bus only when it is determined that said processor does not use the bus in the forthcoming cycle by reference to the predetermined detection signal, the signal control circuit outputting the grant request signal when the request signal requesting the use of the bus from the direct memory access controller is acknowledged, and the direct memory access controller executing a data transfer between the requesting peripheral device and the memory, in a bus cycle in which the predetermined response signal is received.

13. A processor used in a synchronous data transfer system in which a processor, a direct memory access controller and peripheral devices are connected to a memory via a common bus, comprising:

a detection circuit for detecting whether said processor uses the bus in a forthcoming cycle; and a control circuit including a first terminal for receiving a first direct memory access request signal from the direct memory access controller requesting a use of the bus, the control circuit acknowledging the first direct memory access request signal and granting use of the bus in a forthcoming cycle in response to the first direct memory access request signal only when said detection circuit detects that said processor does not use the bus in the forthcoming cycle, said control circuit including a second terminal for receiving a second direct memory access request signal from the direct memory access controller requesting a use of the bus, the control circuit acknowledging the second direct memory access request signal and granting use of the bus in a forthcoming cycle regardless of whether said detection circuit detects that said processor does not use the bus in the forthcoming cycle.

14. A processor used in a synchronous data transfer system in which a processor, a direct memory access controller and peripheral devices are connected to a memory via a common bus, comprising:

a detection circuit for detecting whether said processor uses the bus in a forthcoming cycle; and a control circuit for receiving a direct memory access request signal from the direct memory access controller requesting a use of the bus, the direct memory access request having a lower priority than operations performed by the processor such that the control circuit acknowledges the direct memory access request signal and grants use of the bus in a forthcoming cycle in response to the direct memory access request signal only when said detection circuit detects that said processor does not use the bus in the forthcoming cycle.

15. A processor as recited in claim 14, wherein said control circuit receives a second direct memory access request signal from the direct memory access controller requesting a use of the bus, the second direct memory access request signal having priority over the operations performed by the processor such that the control circuit acknowledges the second direct memory access request signal and grants use of the bus in a forthcoming cycle regardless of whether said detection circuit detects that said processor does not use the bus in the forthcoming cycle.

16. A processor used in a synchronous data transfer system in which a processor, a direct memory access controller and peripheral devices are connected to a memory via a common bus, comprising:

a detection circuit for detecting whether said processor uses the bus in a forthcoming cycle and for outputting a predetermined detection signal when it is determined that said processor does not use the bus in the forthcoming cycle; and a control circuit including a first terminal for receiving a first direct memory access request signal from the direct memory access controller requesting a use of the bus, the control circuit acknowledging the first direct memory access request signal and granting use of the bus in a forthcoming cycle in response to the first direct memory access request signal only when said detection circuit outputs the predetermined detection signal indicating that said processor does not use the bus in the forthcoming cycle, said control circuit including a second terminal for receiving a second direct memory access request signal from the direct memory access controller requesting a use of the bus, the control circuit acknowledging the second direct memory access request signal and granting use of the bus in a forthcoming cycle regardless of whether said detection circuit outputs the predetermined detection signal indicating that said processor does not use the bus in the forthcoming cycle.

17. A processor used in a synchronous data transfer system in which a processor, a direct memory access controller and peripheral devices are connected to a memory via a common bus, comprising:

a detection circuit for detecting whether said processor uses the bus in a forthcoming cycle and for outputting a predetermined detection signal when it is determined that said processor does not use the bus in the forthcoming cycle; and a control circuit for receiving a direct memory access request signal from the direct memory access controller requesting a use of the bus, the direct memory access request having a lower priority than operations performed by the processor such that the control circuit acknowledges the direct memory access request signal and grants use of the bus in a forthcoming cycle in response to the direct memory access request signal only when said detection circuit outputs the predetermined detection signal indicating that said processor does not use the bus in the forthcoming cycle.

18. A processor as recited in claim 17, wherein said control circuit receives a second direct memory access request signal from the direct memory access controller requesting a use of the bus, the second direct memory access request signal having priority over the operations performed by the processor such that the control circuit acknowledges the second direct memory access request signal and grants use of the bus in a forthcoming cycle regardless of whether said detection circuit outputs the predetermined detection signal indicating that said processor does not use the bus in the forthcoming cycle.

* * * * *